Patented Jan. 14, 1936

2,027,374

UNITED STATES PATENT OFFICE 2,027,374

MOUTH TREATING COMPOSITION

Ora S. Fowler, Denver, Colo.

No Drawing. Application May 3, 1932, Serial No. 609,050

8 Claims. (Cl. 167—93)

This invention relates to a method and means for the treatment of mouth affections, or as a preventative for the preservation of the teeth and of the gums and other oral tissues.

Both the medical and dental professions have long since recognized that tooth decay and certain mouth diseases in general, are caused largely by an acid condition of mouth fluids, a fact which is supported by leading authorities on dental and oral pathology.

This acidity is due to different causes, among which are the fermentation of food detritus and the presence of bacteria productive of local elaboration of acids. Irrespective of its causes, an acid condition of the mouth is injurious to both the teeth and the mouth tissues, and the most serious factor in the problem of dental caries consists in the activity of acid-forming organisms in the mouth.

It follows that an alkaline condition of the mouth is essential not only in the preservation of the teeth and mouth tissues, but also in the probable prevention or alleviation of dental caries and diseases or abnormal conditions of the mouth in general. In order to attain this desideratum, many dentrifices and other mouth preparations now in use contain inorganic substances of an alkaline nature, but at their best, they produce only a temporary and frequently incomplete state of alkalinity, soon dissipated by the flow of mouth-fluids and by predominant acid-forming factors.

It is the principal object of the present invention to produce and maintain a complete alkaline condition of the fluids upon and around the teeth and mouth tissues, during periods of sufficient length to span the times of application of dental and oral preparations in the ordinary care of the teeth.

Inorganic substances have proven to be inadequate to produce this result and the present invention is based upon the implantation of living organisms which, when introduced into the mouth, convert an acid condition to one of alkalinity, and which will remain alive in the mouth and multiply, thus continuing this state of alkalinity for an indefinite period.

The organism herein referred to is the bacterium known in science as *Bacillus alcaligenes*, and its usefulness in connection with the present invention was established by the discovery of certain facts in a long period of careful study and experimentation.

It was found and definitely established that the *Bacillus alcaligenes*, feeding upon food debris in the mouth, throws off a waste product strongly alkaline and productive of alkalines in a comparatively free state; that the said Bacillus is non-pathogenic and may be taken into the mouth and into the human system in general without harmful effects; that, upon implantation in the mouth, the *Bacillus alcaligenes* multiplies very rapidly, thereby producing other similar organisms which in their turn reproduce and in this manner continue the state of alkalinity for an indefinite period of time; and that the said Bacillus will inhibit the growth of other bacteria, to the extent of killing them, particularly with reference to acid producing bacteria, such as *Bacillus acidophilus* and *Bacillus bulgaricus*, which are the principal offenders in producing harmful acid conditions of the mouth.

Moreover, the experimentations showed that *Bacillus alcaligenes* is not affected by the presence or absence of air, and that, therefore, the Bacillus may be kept alive in sealed containers for an indefinite period if sufficient nutrition is available.

By virtue of the above, any preparation, such as tooth paste or mouth-wash, commonly used in the care of the teeth and the mouth tissues, and usually containing carbohydrates and/or proteins, may be employed as a vehicle for carrying the bacteria into the mouth and implanting them upon and around the tissues. Tests conducted with a large number of such products now on the market disclosed that in every instance the composition contained sufficient nutrient material to sustain the bacilli in sealed containers over a period of several years.

Immediately upon their implantation, the *Bacilli alcaligenes* become active in the conversion of any acid condition in the mouth to a strongly alkaline condition and by this activity and by the rapid and continued reproduction of other similar organisms, as stated hereinbefore, this alkaline state is continued for a period sufficiently long to effect a substantially continuous state of alkalinity in the ordinary care of the teeth and the mouth by the use of a preparation impregnated with the *Bacilli alcaligenes*.

The normal food debris in the human mouth, provides enough nutrition to sustain a sufficiently large quantity of the *Bacillus alcaligenes*, and by impregnating the mouth-preparation with correspondingly large quantities of the Bacillus, (one per cent by volume of a physiological salt solution suspension of *Bacillus alcaligenes*, containing not less than two billion organisms per c. c. having proved satisfactory in various tests), any acid condition of the mouth may be rapidly and continuously corrected by a superseding state of alkalinity.

Dental caries, tooth decalcifications and inflammatory conditions due to or influenced by acidity of the mouth fluids, may, by the use of the present invention, be prevented, arrested and relieved, owing to its alkaline reaction, and it has been found that the neutralizing and alkaline production and the growth and reproductive activities of the *Bacillus alcaligenes* are strong and vigorous so as to withstand and counteract the motive influences of the natural flow of saliva and other mouth fluids.

What I claim and desire to secure by Letters Patent is:

1. A composition of matter comprising a mouth preparation, containing live non-pathogenic *Bacillus alcaligenes*.

2. A composition of matter comprising a mouth preparation, containing live non-pathogenic *Bacillus alcaligenes* and a food-product for their sustenance.

3. A composition of matter comprising a mouth preparation, containing live non-pathogenic *Bacillus alcaligenes* and carbohydrates.

4. A composition of matter comprising a dentifrice containing live non-pathogenic *Bacillus alcaligenes*.

5. A composition of matter comprising a dentifrice containing live non-pathogenic *Bacillus alcaligenes* and a food product for their sustenance.

6. A composition of matter comprising a nutrient vehicle for implanting bacteria into and around the teeth and mouth tissues, containing live non-pathogenic *Bacillus alcaligenes*.

7. A composition of matter comprising a mouth wash containing live non-pathogenic *Bacillus alcaligenes* in a nutrient media.

8. A composition of matter comprising a biologic antiseptic containing live non-pathogenic *Bacillus alcaligenes* in a nutrient media.

ORA S. FOWLER.